(12) United States Patent
Chang et al.

(10) Patent No.: US 11,750,524 B2
(45) Date of Patent: Sep. 5, 2023

(54) WIRELESS COMMUNICATION SYSTEM AND TRANSMISSION RATE CONTROL METHOD

(71) Applicant: REALTEK SEMICONDUCTOR CORPORATION, Hsinchu (TW)

(72) Inventors: Wei-Hsuan Chang, Hsinchu (TW); Jhe-Yi Lin, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 205 days.

(21) Appl. No.: 17/405,055

(22) Filed: Aug. 18, 2021

(65) Prior Publication Data

US 2022/0141147 A1 May 5, 2022

(30) Foreign Application Priority Data

Oct. 30, 2020 (TW) .................................. 109137768

(51) Int. Cl.
*H04L 12/52* (2006.01)
*H04L 47/25* (2022.01)
*H04L 45/745* (2022.01)

(52) U.S. Cl.
CPC ............ *H04L 47/25* (2013.01); *H04L 45/745* (2013.01)

(58) Field of Classification Search
CPC .............................. H04L 45/745; H04L 47/25
See application file for complete search history.

(56) References Cited

U.S. PATENT DOCUMENTS

| 9,137,341 | B1 * | 9/2015 | Bagchi | ................ | H04L 43/0847 370/332 |
| 9,413,677 | B1 * | 8/2016 | Vargantwar | ............. | H04L 47/70 370/312 |
| 2018/0198522 | A1 * | 7/2018 | Mochizuki | ............. | H04B 10/40 370/312 |

* cited by examiner

*Primary Examiner* — Phuc H Tran
(74) *Attorney, Agent, or Firm* — WPAT, P.C.

(57) ABSTRACT

A wireless communication system includes a transceiver circuit, a memory circuit, and a processor circuit. The transceiver circuit transmits data through subchannels that includes a first subchannel and a second subchannel. The memory circuit stores a lookup table that indicates corresponding relations between transmission rates and channel indicators. The processor circuit selects a first channel indicator from the lookup table according to a first transmission rate of the first subchannel during a statistics interval, determines a difference between the first channel estimated value of the first subchannel and a second channel estimated value of the second subchannel, determines a reference channel indicator according to the difference and the first channel indicator, and selects a corresponding transmission rate from the lookup table according to the reference channel indicator, in order to set a transmission rate of the transceiver circuit over the second subchannel to be the corresponding transmission rate.

20 Claims, 4 Drawing Sheets

WIRELESS COMMUNICATION SYSTEM AND TRANSMISSION RATE CONTROL METHOD

BACKGROUND

1. Technical Field

The present disclosure relates to a wireless communication system. More particularly, the present disclosure relates to a wireless communication system utilizing orthogonal frequency division multiple access and a transmission rate control method thereof.

2. Description of Related Art

In an orthogonal frequency division multiple access (OFDMA) system, a channel may be divided into multiple sub-channels (which are referred to as resource units). Packet transmission rates over these resource units determine an overall transmission performance of the OFDMA system. In some approaches, retry data from a transmitter end are analyzed to set a transmission rate of the resource unit. However, in practical applications, there are only a few subchannel(s) sending the retry data, or a few subchannel(s) having sufficient retry data for analysis. As a result, these approaches are unable to set a proper transmission rate for the subchannel that does not send the retry data or has insufficient data.

SUMMARY

In some aspects, a wireless communication system includes a transceiver circuit, a memory circuit, and a processor circuit. The transceiver circuit is configured to transmit data through a plurality of subchannels, in which the plurality of subchannels include at least one first subchannel and a second subchannel. The memory circuit is configured to store a first lookup table, in which the first lookup table indicates corresponding relations between a plurality of transmission rates and a plurality of channel indicators. The processor circuit configured to: select at least one first channel indicator of the plurality of channel indicators from the first lookup table according to at least one first transmission rate of the at least one first subchannel during a statistics interval; determine at least one difference between at least one first channel estimated value of the at least one first subchannel and a second channel estimated value of the second subchannel; determine a first reference channel indicator according to the at least one difference and the at least one first channel indicator; and select a corresponding transmission rate of the plurality of transmission rates from the first lookup table according to the first reference channel indicator, in order to set a transmission rate of the transceiver circuit over the second subchannel to be the corresponding transmission rate.

In some aspects, a transmission rate control method includes the following operations: establishing a first lookup table, in which the first lookup table indicates corresponding relations between a plurality of transmission rates and a plurality of channel indicators; selecting at least one first channel indicator of the plurality of channel indicators from the first lookup table according to at least one first transmission rate of at least one first subchannel in a plurality of subchannels during a statistics interval; determining at least one difference between at least one first channel estimated value of the at least one first subchannel and a second channel estimated value of the second subchannel in the plurality of subchannels; determining a first reference channel indicator according to the at least one difference and the at least one first channel indicator; and selecting a corresponding transmission rate of the plurality of transmission rates from the first lookup table according to the first reference channel indicator, in order to set a transmission rate of a transceiver circuit over the second subchannel to be the corresponding transmission rate.

These and other objectives of the present disclosure will be described in preferred embodiments with various figures and drawings.

DETAILED DESCRIPTION

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

In this document, the term "coupled" may also be termed as "electrically coupled," and the term "connected" may be termed as "electrically connected." "Coupled" and "connected" may mean "directly coupled" and "directly connected" respectively, or "indirectly coupled" and "indirectly connected" respectively. "Coupled" and "connected" may also be used to indicate that two or more elements cooperate or interact with each other. In this document, the term "circuit" may indicate an object, which is formed with one or more transistors and/or one or more active/passive elements based on a specific arrangement, for processing signals.

As used herein, the term "and/or" includes any and all combinations of one or more of the associated listed items. Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. For ease of understanding, like elements in various figures are designated with the same reference number.

Figure 1:
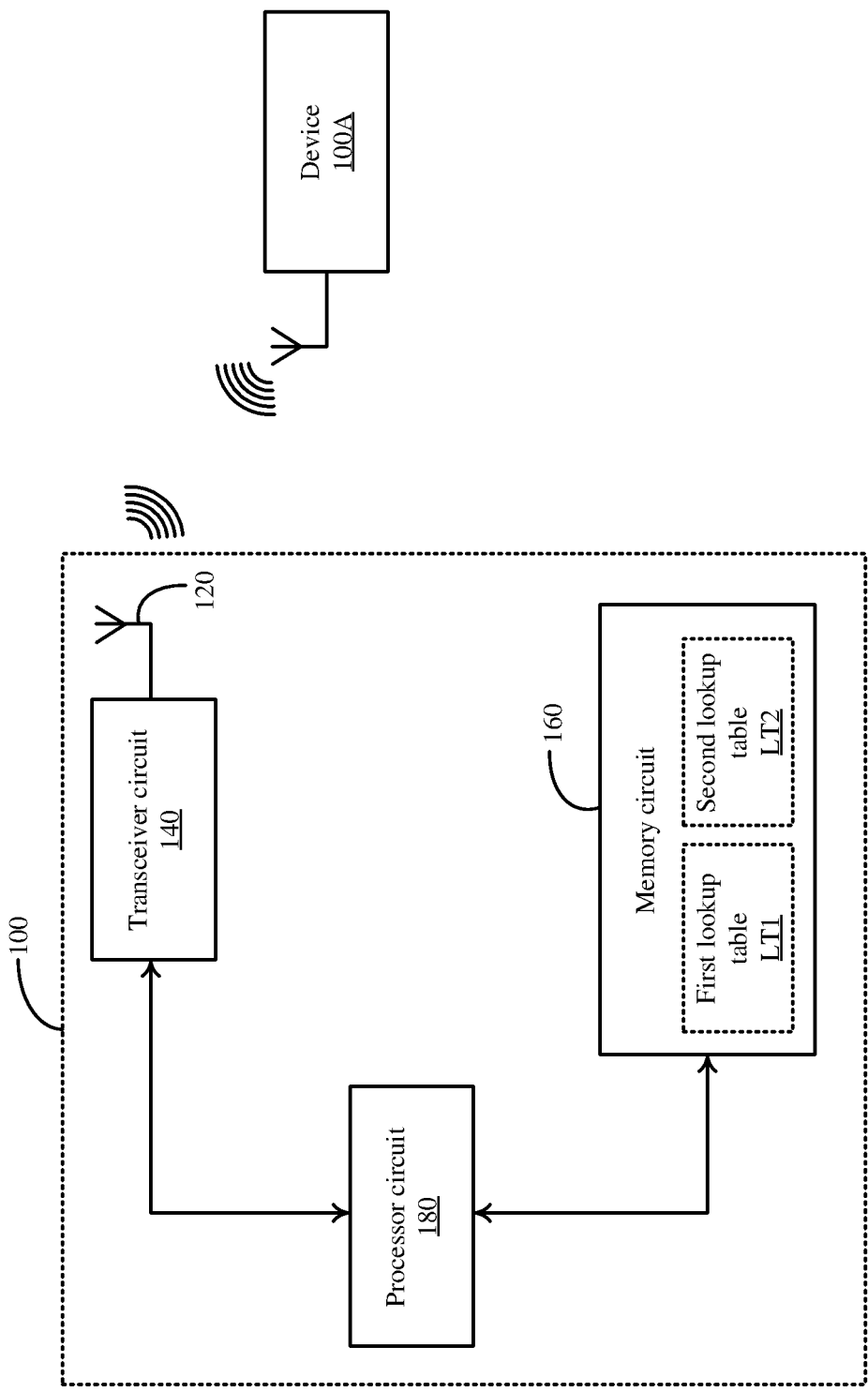
FIG. 1 is a schematic diagram of a wireless communication system according to some embodiments of the present disclosure.

FIG. 1 is a schematic diagram of a wireless communication system 100 according to some embodiments of the present disclosure. In some embodiments, the wireless communication system 100 may utilizes an orthogonal frequency division multiple access (OFDMA) technology to connect with other device(s) (e.g., a device 100A).

Figure 3:
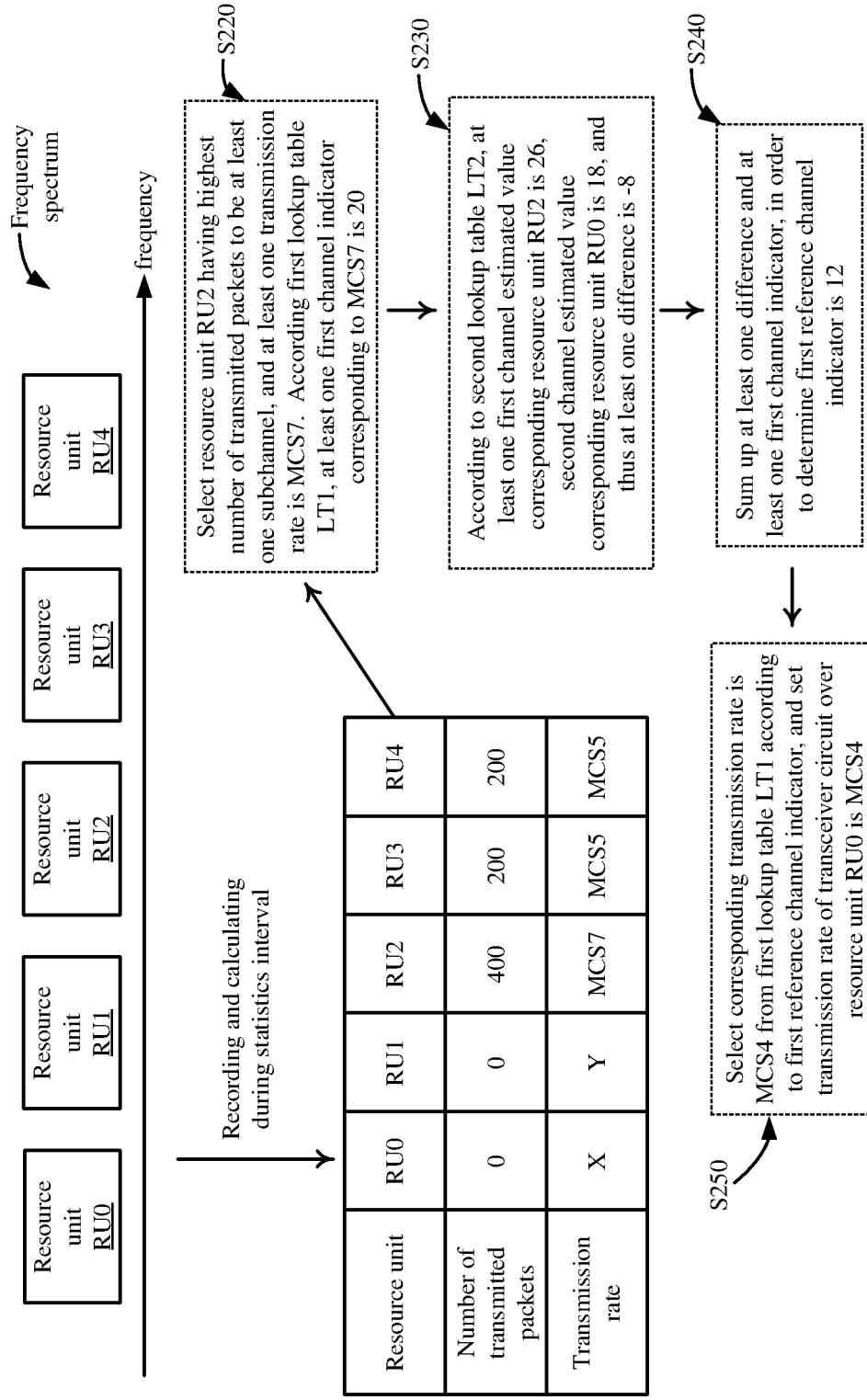
FIG. 3 is a schematic diagram showing a frequency spectrum of the wireless communication system in FIG. 1 and related operations in FIG. 2 according to some embodiments of the present disclosure.

The wireless communication system 100 includes an antenna 120, a transceiver circuit 140, a memory circuit 160, and a processor circuit 180. The transceiver circuit 140 may transmit data to the device 100A through the antenna 120, or receive data from the device 100A through the antenna 120. In some embodiments, the transceiver circuit 140 may transmit data through multiple subchannels. In some embodiments, as shown in FIG. 3, the aforementioned subchannels may be resource units RU0-RU4 in the OFDMA technology. In some embodiments, the transceiver circuit 140 may include (but not limited to) a transmitter circuit (not shown in the figure), a receiver circuit (not shown in the figure), a baseband circuit (not shown in the figure), and so on, in order to transmit and/or receive data.

In some embodiments, the memory circuit 160 is configured to store a first lookup table LT1, which is configured to indicate corresponding relations between transmission rates and channel indicators. The processor circuit 180 may utilize the first lookup table LT1 to set the transmission rate of the subchannel. Operations of utilizing the first lookup table LT1 will be described with reference to FIGS. 2-4. In some embodiments, the memory circuit 160 stores one or more program codes, and the processor circuit 180 may execute the one or more program codes, in order to perform operations in FIG. 2 to set the transmission rate. In some embodiments, a simulation and/or a measurement may be performed with the wireless communication system 100 in advance, in order to establish the first lookup table LT1. In some embodiments, the first lookup table LT1 may be a measurement result reported from the device 100A (e.g., a receiver end). In some embodiments, the first lookup table LT1 may be a test result of a channel estimation performed by the wireless communication system 100 (e.g., a transmitter end).

In some embodiments, the first lookup table LT1 may be expressed as the following table (hereinafter referred to as table 1):

| Transmission rate | Channel indicator |
|---|---|
| MCS0 | 1 |
| MCS1 | 4 |
| MCS2 | 6 |
| MCS3 | 9 |
| MCS4 | 12 |
| MCS5 | 16 |
| MCS6 | 18 |
| MCS7 | 20 |
| MCS8 | 24 |
| MCS9 | 28 |
| MCS10 | 32 |
| MCS11 | 36 |

In the first lookup table LT1 of this embodiment, the transmission rate listed in the left column may be indicated by a modulation and coding scheme (MCS) index. If the MCS index (the values after the letters) is higher, the transmission rate is higher. For example, a transmission rate corresponding to MCS9 is higher than that corresponding to MCS8. In some embodiments, the channel indicator in the right column may be (but not limited to) a signal to noise ratio (hereinafter referred to as "SNR," its unit of expression is decibels (dB)) corresponding to each transmission rate.

In some embodiments, the first lookup table LT1 may be expressed as the following table (hereinafter referred to as table 2):

| Transmission rate | Channel indicator |
|---|---|
| MCS0 | 0 |
| MCS1 | 3 |
| MCS2 | 5 |
| MCS3 | 8 |
| MCS4 | 11 |
| MCS5 | 15 |
| MCS6 | 17 |
| MCS7 | 19 |
| MCS8 | 23 |
| MCS9 | 27 |
| MCS10 | 31 |
| MCS11 | 35 |

Compared with the embodiments employing the table 1, in the embodiments employing the table 2, the channel indicator may be a difference between a SNR corresponding each transmission rate and a SNR corresponding to a lowest transmission rate. For example, in the table 1, the SNR corresponding to MCS0 is 1 dB, and the SNR corresponding to MCS1 is 4 dB. Accordingly, in the table 2, the channel indicator corresponding to MCS0 is 0 (i.e., 1−1=0), and the channel indicator corresponding to MCS1 is 3 (i.e., 4−1=3). With this analogy (e.g., the channel indicator corresponding to MCS8 is 24−1=23), the arrangements of the channel indicators in the table 2 can be understood. In some embodiments, by recording the difference between the channel indicators corresponding to the transmission rates, it is able to reflect the channel difference of the transmission rates more accurately. The table 1 and the table 2 are given for illustrative purposes, and the present disclosure is not limited thereto. Various types of the first lookup table LT1 able to record the corresponding relations between the transmission rates and the channel indicators are within the contemplated scope of the present disclosure.

In some embodiments, the memory circuit 160 may be (but not limited to) a non-transitory computer readable storage medium. For example, the computer readable storage medium includes a register, a semiconductor or solid state memory, a tape, a removable computer disk drive, a random access memory (RAM), a rigid disk, an optical disk, or the like. In some embodiments, the processor circuit 180 may be (but not limited to) a central processing unit (CPU), an application specific integrated circuit, a multi-processor, a pipeline processor, a distributed system, or the like. Various circuits or units to implement the memory circuit 160 and the processor circuit 180 are within the contemplated scope of the present disclosure.

Figure 2:
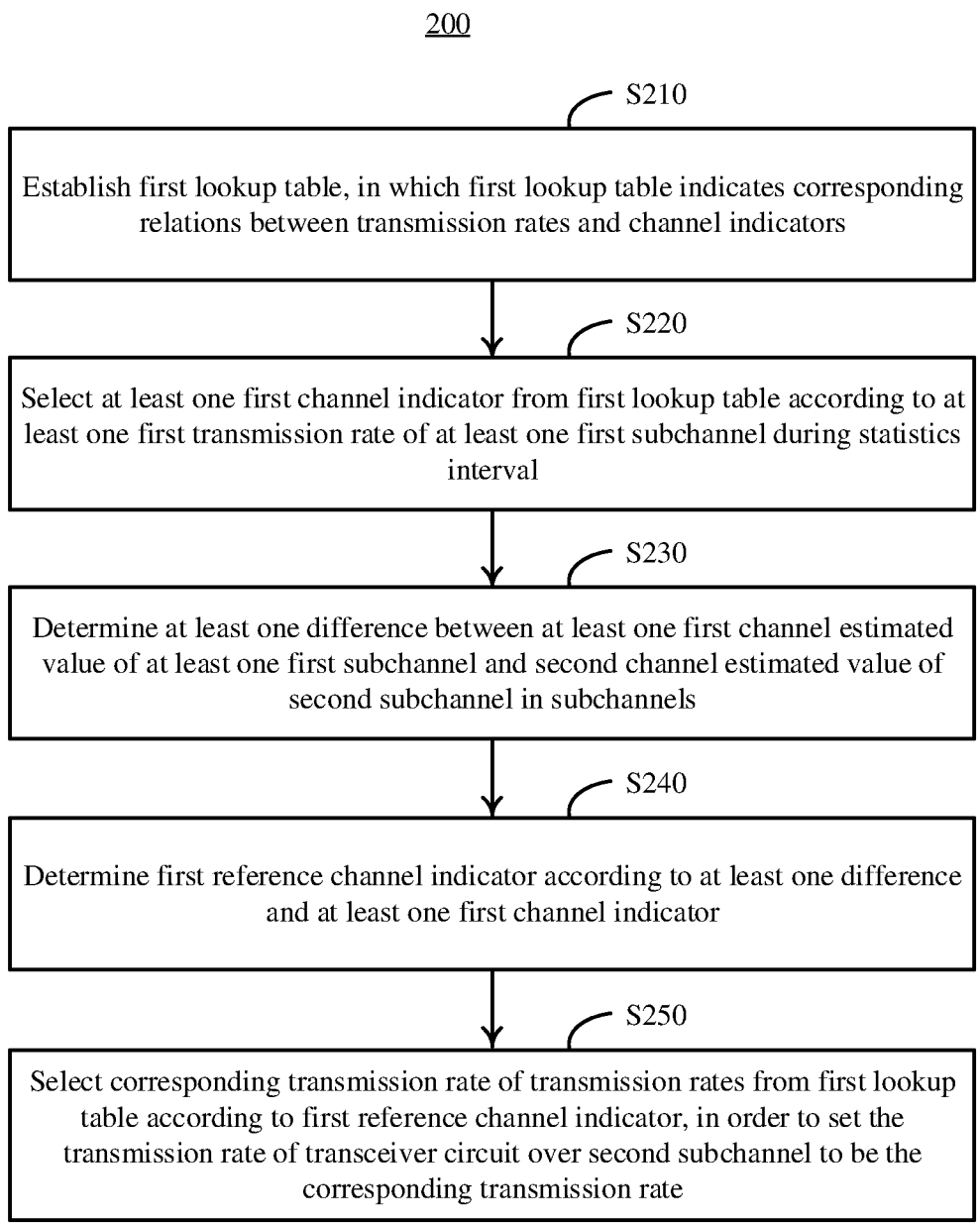
FIG. 2 is a flow chart of a transmission rate control method according to some embodiments of the present disclosure.

FIG. 2 is a flow chart of a transmission rate control method 200 according to some embodiments of the present disclosure. In some embodiments, the transmission rate control method 200 may be (but not limited to) performed by the processor circuit 180 in FIG. 1.

In operation S210, the first lookup table is established, in which the first lookup table LT1 indicates the corresponding relations between the transmission rates and the channel indicators. For example, as mentioned above, the memory circuit 160 stores the first lookup table LT1 shown in the table 1 or 2.

In operation S220, a first channel indicator is selected from the first lookup table LT1 according to at least one first transmission rate of at least one first subchannel during a statistics interval.

In order to illustrate operation S220, reference is made to FIG. 3. FIG. 3 is a schematic diagram showing a frequency spectrum of the wireless communication system 100 in FIG. 1 and related operations in FIG. 2 according to some embodiments of the present disclosure. As shown in FIG. 3, the frequency spectrum is separated into five resource units RU0-RU4. The processor circuit 180 may record numbers of transmitted packets of the resource units RU0-RU4 during a predetermined statistics interval, and utilize a rate adaptation algorithm or a resource allocation algorithm to determine the transmission rates of the resource units RU0-RU4. For example, during the statistics interval, numbers of packets transmitted through the resource unit RU0 and the resource unit RU1 is 0, and thus the transmission rate of each of the resource unit RU0 and the resource unit RU1 is unknown (which are labeled as X and Y, respectively); the number of packets transmitted through the resource unit RU2 is 400, and the transmission rate corresponding to the resource unit RU2 is MCS7; the number of packets transmitted through the resource unit RU3 is 200, and the transmission rate corresponding to the resource unit RU3 is MCS5; and the number of packets transmitted through the resource unit RU4 is 200, and the number of packets transmitted through the resource unit RU4 is MCS5.

In some embodiments, the processor circuit 180 may select the resource unit having a highest number of transmitted packets in the resource units RU0-RU4 to be the aforementioned at least one first subchannel. As shown in FIG. 3, as the resource unit RU2 has the highest number of transmitted packets (i.e., 400) during the statistics interval, the processor circuit 180 may select the resource unit RU2 to be the at least one first subchannel, and select the corresponding at least one first channel indicator from the first lookup table LT1 (e.g., the table 1 or 2) according to the transmission rate MCS7 corresponding to the resource unit RU2. For example, the processor circuit 180 may acquire that the at least one first channel indicator is 20 from the table 1 according to the transmission rate MCS7 corresponding to the resource unit RU2.

With continued reference to FIG. 2, in operation S230, at least one difference between at least one first channel estimated value of the at least one first subchannel and a second channel estimated value of a second subchannel in the subchannels is determined. In some embodiments, as shown in FIG. 1, the memory circuit 160 further stores a second lookup table LT2, which is configured to indicate channel estimated values of the subchannels (i.e., the resource units RU0-RU4). The processor circuit 180 may acquire the at least one first channel estimated value and the second channel estimated value according to the second lookup table LT2. In some embodiments, the second lookup table LT2 may be expressed as the following table (hereinafter to referred to as table 3), in which the numbers of transmitted packets and the transmission rates are the same as those in FIG. 3.

| resource unit | RU0 | RU1 | RU2 | RU3 | RU4 |
| --- | --- | --- | --- | --- | --- |
| number of transmitted packets | 0 | 0 | 400 | 200 | 200 |
| transmission rate | X | Y | MCS7 | MCS5 | MCS5 |
| channel estimated value | 18 | 22 | 26 | 21 | 22 |

In some embodiments, based on a beamforming protocol of an OFDMA system, the processor circuit 180 periodically sends a request frame to the device 100A via the transceiver circuit 140, and the device 100A sends back a channel quality indicator which is measured in response to this frame. In some embodiments, the channel quality indicator is to indicate a SNR of a corresponding subchannel (i.e., resource unit). The processor circuit 180 may record corresponding relations between the channel quality indicators (i.e., channel estimated values) and the resource unit RU0-RU4, in order to establish the second lookup table LT2. In some embodiments, when the transceiver circuit 140 sends the request frame to the device 100A, the processor circuit 180 may perform a channel estimation, in order to acquire the channel estimated value corresponding to each subchannel and establish the second lookup table LT2. The arrangements of the second lookup table LT2 are given for illustrative purposes, and the present disclosure is not limited thereto.

In some embodiments, the number of transmitted packets of the second subchannel during the statistics interval is less than a predetermined value (e.g., 100) or is zero. The predetermined value is for selecting resource unit(s) with insufficient estimated data. In examples of FIG. 3, as the number of transmitted packets of the resource unit RU0 or that of the resource unit RU1 is zero and is less than 100, and the second subchannel may be the resource unit RU0 or the resource unit RU1. Taking the resource unit RU0 being the second subchannel as an example, in the previous operation, the resource unit RU2 is selected to be the at least one first subchannel. According to the second lookup table LT2 (as shown in the table 3), the processor circuit 180 obtains that the at least one first channel estimated value corresponding to the resource unit RU2 is 26, and the second channel estimated value corresponding to the resource unit RU0 is 18. In some embodiments, the processor circuit 180 may subtract the at least one first channel estimated value from the second channel estimated value, in order to determine the at least one difference between the at least one first channel estimated value and the second channel estimated value. In other words, in this example, the at least one difference is −8 (i.e., 18−26=−8).

With continued reference to FIG. 2, in operation S240, a first reference channel indicator is determined according to the at least one difference and the at least one first channel indicator. In operation S250, a corresponding transmission rate of the transmission rates is selected from the first lookup table according to the first reference channel indicator, in order to set a transmission rate of the transceiver circuit over the second subchannel to be the corresponding transmission rate.

In some embodiments, as the difference of the channel estimated values and the channel indicator are all corresponding to the SNR, the processor circuit 180 may sum up the at least one difference and the at least one first channel indicator, in order to determine the reference channel indicator. As shown in examples of FIG. 3, after the processor circuit 180 obtains that the at least one first channel indicator is 20 and the at least one difference is −8, the processor circuit 180 may sum up the at least one first channel indicator and the at least one difference to generate the first reference channel indicator. In other words, in this example, the first reference channel indicator is 12 (i.e., 20+(−8)=12). Afterwards, according to the first lookup table LT1 (as shown in the table 1), the processor circuit 180 may select the transmission rate MCS4 corresponding to the first reference channel indicator (e.g., 12) from the first lookup table LT1, in order to set the transmission rate of the transceiver circuit 140 over the resource unit RU0 is MCS4.

With similar operations, the processor circuit 180 may set the transmission rate of the resource unit RU1 as well. With the transmission rate control method 200, the processor circuit 180 may utilize channel characteristic(s) of the at least one first subchannel (e.g., the resource unit RU2) that has sufficient statistics data to estimate channel characteristic(s) of the second subchannel (e.g., the resource units RU0 and RU1) that has insufficient statistics data, in order to set a proper transmission rate over the subchannel(s) that has insufficient statistics data.

The above description of the transmission rate control method 200 includes exemplary operations, but the operations are not necessarily performed in the order described above. Operations of the transmission rate control method 200 may be added, replaced, changed order, and/or eliminated as appropriate, or the operations are able to be executed simultaneously or partially simultaneously as appropriate, in accordance with the spirit and scope of various embodiments of the present disclosure.

Figure 4:
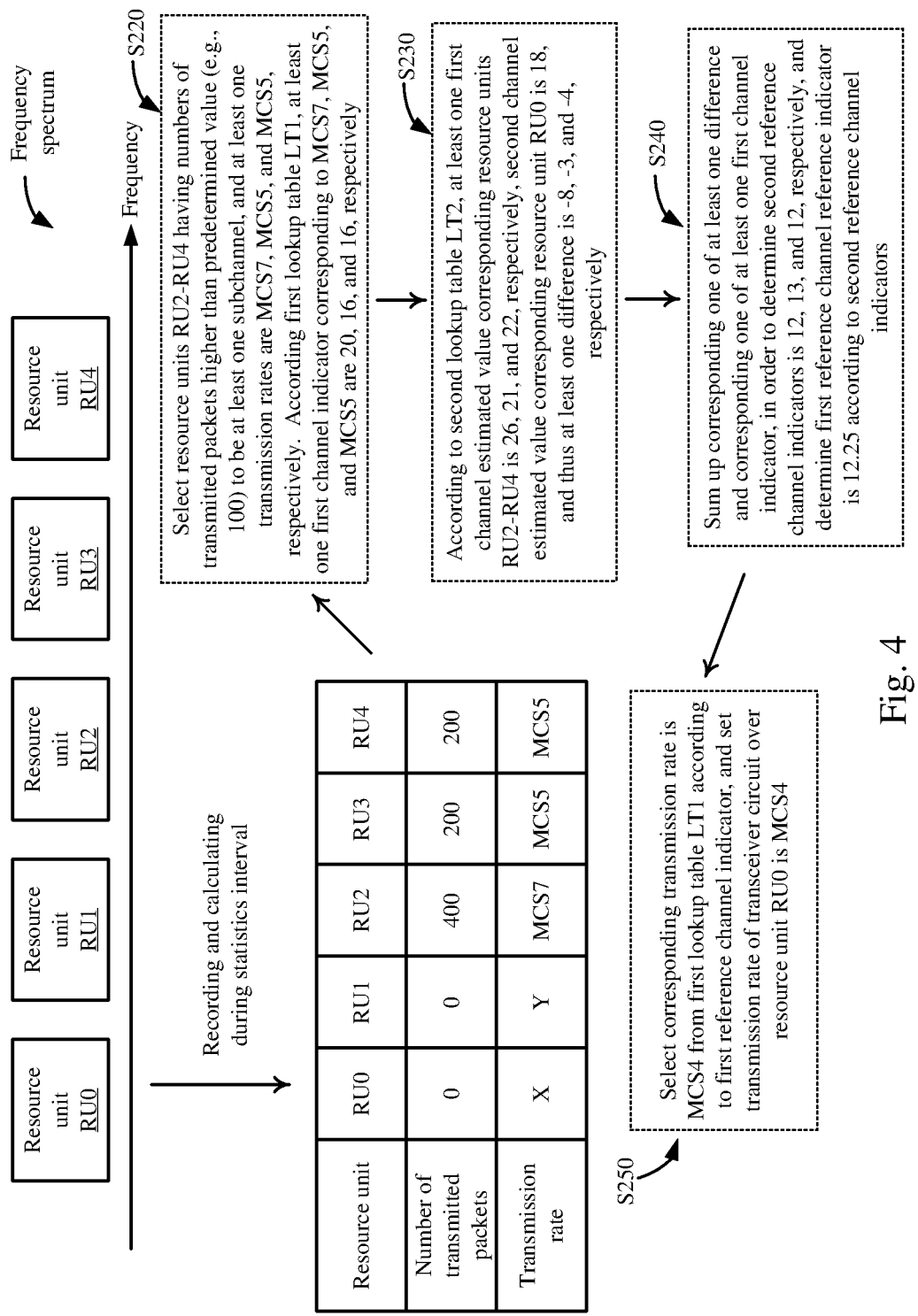
FIG. 4 is a schematic diagram showing a frequency spectrum of the wireless communication system in FIG. 1 and related operations in FIG. 2 according to some embodiments of the present disclosure.

FIG. 4 is a schematic diagram showing a frequency spectrum of the wireless communication system 100 in FIG. 1 and related operations in FIG. 2 according to some embodiments of the present disclosure. Compared with FIG. 3, in this example, the number of transmitted packets of each of the at least one first subchannel during the statistics interval is higher than or equal to a predetermined value. In some embodiments, if the number of transmitted packets of a resource unit is higher, a reference value of statistics data (e.g., transmission rate) associated with the resource unit is higher. Accordingly, by setting the predetermined value, it is able to select resource unit(s) that has a certain number of transmitted packets to obtain a more accurate estimated result.

For example, the predetermined value may be (but not limited to) 100, the processor circuit 180 may select at least one resource unit having a number of transmitted packets higher than 100 during the statistics interval from the resource units RU0-RU4 to be the at least one first subchannel (i.e., operation S220). As shown in FIG. 4, as the numbers of transmitted packets of the resource unit RU2, the resource unit RU3, and the resource unit RU4 are all higher than 100, the processor circuit 180 may select the resource unit RU2, the resource unit RU3, and the resource unit RU4 to be the at least one first subchannel. The processor circuit 180 may select the corresponding channel indicators from the first lookup table LT1 (e.g., the table 1 or 2) according to the transmission rates MCS7, MCS5, and MCS5 corresponding to the resource units RU2, RU3, and RU4 respectively. For example, the processor circuit 180 obtains that the at least one first channel indicators are 20, 16, and 16 from the table 1 according to the transmission rates MCS7, MCS7, and MCS5.

Afterwards, in operation S230, according to the second lookup table LT2 (as shown in the table 3), the processor circuit 180 may obtain that the at least one first channel estimated value corresponding to the resource units RU2, RU3, and RU4 is 26, 21, and 22, respectively, and obtain that the second channel estimated value corresponding to the resource unit RU0 is 18. Accordingly, the processor circuit 180 may determine that the at least one difference are −8 (i.e., 18−26), −3 (i.e., 18−21), and −4 (i.e., 18−22), respectively.

In some embodiments, in operation S240, the processor circuit 180 may determine second reference channel indicators according to the at least difference and the at least one first channel indicator, and perform a weighted calculation according to the second reference channel indicators to determine the first reference channel indicator. In some embodiments, the processor circuit 180 may sum up a corresponding one of the at least one difference and a corresponding one of the at least one first channel indicator, in order to determine at least one reference channel indicator. In some embodiments, if the number of transmitted packets of one of the at least one first subchannel (hereinafter referred to as a target subchannel) during the statistics interval is higher, a weight in the weighted calculation for a corresponding one of the second reference channel indicators (e.g., the second reference channel indicator corresponding to the target subchannel) is higher.

For example, the processor circuit 180 may sum up at least first channel indicator (i.e., 20) corresponding to the resource unit RU2 and the at least difference (i.e., −8) corresponding to the resource unit RU2, in order to determine that the at least one reference channel indicator is 12. With this analogy, the processor circuit 180 may determine the second reference channel indicators corresponding to the resource unit RU2, the resource unit RU3, the resource unit RU4 are 12 (i.e., 20+(−8)), 13 (i.e., 16+(−3)), and 12 (i.e. 16+(−4)), respectively. As the numbers of transmitted packets of the resource unit RU2, the resource unit RU3, and the resource unit RU4 are 400, 200, and 200, respectively, the processor circuit 180 may determine that the weights of the second reference channel indicators are 2, 1, and 1 according to a ratio among these numbers of transmitted packets. As a result, the processor circuit 180 may utilize the following equation to obtain that the first reference channel indicator is 12.25:

$$\frac{2}{2+1+1} \times 12 + \frac{1}{2+1+1} \times 13 + \frac{1}{2+1+1} \times 12 =$$
$$0.5 \times 12 + 0.25 \times 13 + 0.25 \times 12 = 12.25$$

in which 0.5, 0.25, 0.25 are weight respectively corresponding to the resource unit RU2, the resource unit RU3, and the resource unit RU4, and 12, 13, and 13 are the first channel indicators respectively corresponding to the resource unit RU2, the resource unit RU3, and the resource unit RU4.

In some embodiments, the above weighted calculation may be a maximum ratio combining calculation, but the present disclosure is not limited thereto. Various proper weighted calculations are within the contemplated scope of the present disclosure.

In operation S250, according to the first lookup table LT1 (e.g., the table 1), the processor circuit 180 may select a transmission rate corresponding a channel indicator that is closest to (or equal to) the first reference channel indicator from the first lookup table LT1. In this example, the first reference channel indicator is 12.25, and thus the processor circuit 180 may select the transmission rate MCS4 corresponding to the channel indicator 12 (which is closest to 12.25), in order to set the transmission rate of the transceiver circuit 140 over the resource unit RU0 to be MCS4. Similarly, with similar operations, the processor circuit 180 may set the transmission rate over the resource unit RU1 as well.

The above values for numbers of the subchannels, the predetermined value, the transmission rates, and the channel indicators are given for illustrative purposes, and the present disclosure is not limited thereto. The above values may be adjusted according to practical requirements.

As described above, with the wireless communication system and the transmission rate control method in some embodiments of the present disclosure, it is able to set a proper transmission rate over a subchannel having insufficient statistics data, in order to increase overall transmission performance.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

The aforementioned descriptions represent merely some embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. A wireless communication system, comprising:
   a transceiver circuit configured to transmit data through a plurality of subchannels, wherein the plurality of subchannels comprise at least one first subchannel and a second subchannel;
   a memory circuit configured to store a first lookup table, wherein the first lookup table indicates corresponding relations between a plurality of transmission rates and a plurality of channel indicators; and
   a processor circuit configured to:
      select at least one first channel indicator of the plurality of channel indicators from the first lookup table according to at least one first transmission rate of the at least one first subchannel during a statistics interval;
      determine at least one difference between at least one first channel estimated value of the at least one first subchannel and a second channel estimated value of the second subchannel;
      determine a first reference channel indicator according to the at least one difference and the at least one first channel indicator; and
      select a corresponding transmission rate of the plurality of transmission rates from the first lookup table according to the first reference channel indicator, in order to set a transmission rate of the transceiver circuit over the second subchannel to be the corresponding transmission rate.

2. The wireless communication system of claim 1, wherein the at least one first subchannel is a subchannel having a highest number of transmitted packets during the statistics interval in the plurality of subchannels.

3. The wireless communication system of claim 1, wherein the processor circuit is configured to sum up the at least one difference and the at least one first channel indicator, in order to determine the first reference channel indicator.

4. The wireless communication system of claim 1, wherein a number of transmitted packets of the second subchannel during the statistics interval is less than a predetermined value or is zero.

5. The wireless communication system of claim 1, wherein a number of transmitted packets of each of the at least one first subchannel during the statistics interval is greater than or equal to a predetermined value, and the processor circuit is configured to determine a plurality of second reference channel indicators according to the at least one difference and the at least one first channel indicator, and perform a weighted calculation according to the plurality of second reference channel indicators to determine the first reference channel indicator.

6. The wireless communication system of claim 5, wherein if the number of transmitted packets of a target subchannel in the at least one first subchannel is higher, a weight of one of the plurality of second reference channel indicators in the weighted calculation is higher, and the one of the plurality of second reference channel indicators corresponds to the target subchannel.

7. The wireless communication system of claim 5, wherein the weighted calculation is a maximum ratio combining calculation.

8. The wireless communication system of claim 1, wherein the processor circuit is configured to subtract the at least one first channel estimated value from the second channel estimated value, in order to determine the at least one difference.

9. The wireless communication system of claim 1, wherein the memory circuit is further configured to store a second lookup table, the second lookup table is configured to indicate a plurality of channel estimated values of the plurality of subchannels, and the processor circuit is further configured to obtain the at least one first channel estimated value and the second channel estimated value according to the second lookup table.

10. The wireless communication system of claim 1, wherein the plurality of subchannels are a plurality of resource units in an orthogonal frequency division multiple access (OFDMA) system.

11. A transmission rate control method, comprising:
    establishing a first lookup table, wherein the first lookup table indicates corresponding relations between a plurality of transmission rates and a plurality of channel indicators;
    selecting at least one first channel indicator of the plurality of channel indicators from the first lookup table according to at least one first transmission rate of at least one first subchannel in a plurality of subchannels during a statistics interval;
    determining at least one difference between at least one first channel estimated value of the at least one first subchannel and a second channel estimated value of the second subchannel in the plurality of subchannels;
    determining a first reference channel indicator according to the at least one difference and the at least one first channel indicator; and
    selecting a corresponding transmission rate of the plurality of transmission rates from the first lookup table according to the first reference channel indicator, in order to set a transmission rate of a transceiver circuit over the second subchannel to be the corresponding transmission rate.

12. The transmission rate control method of claim 11, wherein the at least one first subchannel is a subchannel having a highest number of transmitted packets during the statistics interval in the plurality of subchannels.

13. The transmission rate control method of claim 11, wherein determining the first reference channel indicator according to the at least one difference and the at least one first channel indicator comprises:

summing up the at least one difference and the at least one first channel indicator, in order to determine the first reference channel indicator.

14. The transmission rate control method of claim 11, wherein a number of transmitted packets of the second subchannel during the statistics interval is less than a predetermined value or is zero.

15. The transmission rate control method of claim 11, wherein a number of transmitted packets of each of the at least one first subchannel during the statistics interval is greater than or equal to a predetermined value, and determining the first reference channel indicator according to the at least one difference and the at least one first channel indicator comprises:

determining a plurality of second reference channel indicators according to the at least one difference and the at least one first channel indicator; and performing a weighted calculation according to the plurality of second reference channel indicators to determine the first reference channel indicator.

16. The transmission rate control method of claim 15, wherein if the number of transmitted packets of a target subchannel in the at least one first subchannel is higher, a weight of one of the plurality of second reference channel indicators in the weighted calculation is higher, and the one of the plurality of second reference channel indicators corresponds to the target subchannel.

17. The transmission rate control method of claim 15, wherein the weighted calculation is a maximum ratio combining calculation.

18. The transmission rate control method of claim 11, wherein determining the at least one difference between the at least one first channel estimated value of the at least one first subchannel and the second channel estimated value of the second subchannel in the plurality of subchannels comprises:

subtracting the at least one first channel estimated value from the second channel estimated value, in order to determine the at least one difference.

19. The transmission rate control method of claim 11, wherein determining the at least one difference between the at least one first channel estimated value of the at least one first subchannel and the second channel estimated value of the second subchannel in the plurality of subchannels comprises:

obtaining the at least one first channel estimated value and the second channel estimated value according to a second lookup table, wherein the second lookup table is configured to indicate a plurality of channel estimated values of the plurality of subchannels.

20. The transmission rate control method of claim 11, wherein the plurality of subchannels are a plurality of resource units in an orthogonal frequency division multiple access (OFDMA) system.

* * * * *